United States Patent
Minemura et al.

(10) Patent No.: US 10,252,715 B2
(45) Date of Patent: Apr. 9, 2019

(54) DRIVING ASSISTANCE APPARATUS

(71) Applicant: DENSO CORPORATION, Kariya, Aichi-pref. (JP)

(72) Inventors: Akitoshi Minemura, Kariya (JP); Akira Isogai, Kariya (JP); Yosuke Ito, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 131 days.

(21) Appl. No.: 15/500,421

(22) PCT Filed: Jul. 22, 2015

(86) PCT No.: PCT/JP2015/070796
§ 371 (c)(1),
(2) Date: Jan. 30, 2017

(87) PCT Pub. No.: WO2016/017494
PCT Pub. Date: Feb. 4, 2016

(65) Prior Publication Data
US 2017/0217432 A1    Aug. 3, 2017

(30) Foreign Application Priority Data
Aug. 1, 2014 (JP) .................... 2014-157780

(51) Int. Cl.
*B60W 30/09*    (2012.01)
*G08G 1/16*    (2006.01)
(Continued)

(52) U.S. Cl.
CPC ............ *B60W 30/09* (2013.01); *B60W 10/18* (2013.01); *B60W 10/20* (2013.01); *G05D 1/0246* (2013.01);
(Continued)

(58) Field of Classification Search
CPC .... B60W 30/12; B60W 40/076; B60W 30/09; B60W 40/1005; B60W 10/18;
(Continued)

(56) References Cited

U.S. PATENT DOCUMENTS

2010/0238051 A1* 9/2010 Suzuki ...................... B60R 1/00
340/932.2
2011/0137488 A1* 6/2011 Sakugawa ............. B60W 30/12
701/1
(Continued)

FOREIGN PATENT DOCUMENTS

JP    2004-268829 A    9/2004
JP    2012-48460 A    3/2012
(Continued)

*Primary Examiner* — Behrang Badii
(74) *Attorney, Agent, or Firm* — Knobbe, Martens, Olson & Bear, LLP

(57) ABSTRACT

A driving assistance apparatus measures a position and a movement direction of a target object present in the periphery of an own vehicle. The driving assistance apparatus performs a driving assistance process of the own vehicle when the measured position of the target object is within a determination area provided in the periphery of the own vehicle. The driving assistance apparatus corrects the determination area in a direction at which the target object is measured, when the target object is determined to be moving towards the determination area based on the measured movement direction of the target object.

15 Claims, 4 Drawing Sheets

(51) Int. Cl.
*B60W 10/18* (2012.01)
*B60W 10/20* (2006.01)
*G05D 1/02* (2006.01)
*B60R 21/0134* (2006.01)

(52) U.S. Cl.
CPC .......... *G08G 1/166* (2013.01); *B60R 21/0134* (2013.01); *B60W 2420/42* (2013.01); *B60W 2510/18* (2013.01); *B60W 2510/20* (2013.01); *B60W 2520/10* (2013.01); *B60W 2520/14* (2013.01); *B60W 2550/10* (2013.01); *B60W 2710/18* (2013.01); *B60W 2710/20* (2013.01); *B60W 2720/10* (2013.01); *B60W 2720/14* (2013.01)

(58) Field of Classification Search
CPC . B60W 10/20; B62D 15/025; B62D 15/0265; B62D 15/0275; B62D 15/0285; B62D 15/027; G05D 1/00; G05D 1/0246; G06F 7/00; B60R 1/00; B60Q 1/48; B60S 3/00; B60S 3/04; E03B 1/00; G08G 1/167; G08G 1/0112; G08G 1/0129; G08G 1/0141; G08G 1/166; G06T 15/205; H04N 7/18; B60T 7/22; B60T 8/172; B60T 8/245; G01C 21/3697
See application file for complete search history.

(56) References Cited

U.S. PATENT DOCUMENTS

| | | | | |
|---|---|---|---|---|
| 2011/0197935 | A1* | 8/2011 | Belanger | B60S 3/04 |
| | | | | 134/123 |
| 2012/0277957 | A1* | 11/2012 | Inoue | B60W 30/12 |
| | | | | 701/41 |
| 2013/0286205 | A1 | 10/2013 | Okada et al. | |
| 2014/0063248 | A1 | 3/2014 | Sakagami et al. | |

FOREIGN PATENT DOCUMENTS

| | | |
|---|---|---|
| JP | 2013-232091 A | 11/2013 |
| JP | 2014-50100 A | 3/2014 |
| JP | 2015-24713 A | 2/2015 |

* cited by examiner

DRIVING ASSISTANCE APPARATUS

CROSS-REFERENCE TO RELATED APPLICATION

This application is a U.S. National Phase Application under 35 U.S.C. 371 of International Application No. PCT/JP2015/070796 filed on Jul. 22, 2015 and published in Japanese as WO 2016/017494 Al on Feb. 4, 2016. This application is based on and claims the benefit of priority from Japanese Patent Application No. 2014-157780, filed Aug. 1, 2014. The entire disclosures of all of the above applications are incorporated herein by reference.

TECHNICAL FIELD

The present invention relates to a driving assistance apparatus that performs driving assistance of a vehicle.

BACKGROUND ART

It is known that: based on a maximum speed of a pedestrian, a pedestrian abrupt-movement zone is provided on both sides of a vehicle width zone set along a predicted trajectory of an own vehicle; a pedestrian positioned in the pedestrian abrupt-movement zones is determined to be a pedestrian having a high collision risk; and a warning or the like is performed (for example, PTL 1). As a result, a collision can be avoided even when the pedestrian makes an abrupt movement.

CITATION LIST

Patent Literature

[PTL 1] JP-A-2004-268829

SUMMARY OF INVENTION

Technical Problem

However, in some cases, the pedestrian may move at a speed slower than the maximum speed. When such a pedestrian is present in the pedestrian abrupt-movement zone, an unnecessary warning or the like is performed.
The present invention has been achieved in light of such issues. An object of the present invention is to provide a technology for starting driving assistance in a more appropriate manner.

Solution to Problem

A driving assistance apparatus according to a first aspect of the present invention includes: a measuring means that measures a position and a movement direction of a target object present in an own vehicle periphery; a driving assisting means that performs a driving assistance process of the own vehicle when the position of the target object measured by the measuring means is within a determination area provided in the own vehicle periphery; and a correcting means that corrects the determination area in a direction at which the target object is measured when the target object measured by the measuring means is determined to be moving towards the determination area.

As a result of a configuration such as this, when the target object is moving towards the determination area, and the risk of collision between the own vehicle and the target object is high, the determination area is expanded. The driving assistance process is started at an earlier stage. Therefore, operation delay of the driving assistance process no longer occurs. Meanwhile, when the target object is stationary or is moving in a direction away from the determination area, the determination area is maintained as is. Therefore, an unnecessary driving assistance process is not started. Consequently, the driving assistance process can be started in a more appropriate manner.

A driving assistance apparatus according to a second aspect of the present invention includes: a measuring means that measures a position and a movement direction of a target object present in an own vehicle periphery; and a driving assisting means that performs a driving assistance process of the own vehicle when the position of the target object measured by the measuring means is within a first area provided in the own vehicle periphery, in which the driving assisting means performs the driving assistance process in, not only the first area, but also a second area in a direction at which the target object is measured when the target object measured by the measuring means is determined to be moving towards the first area.

The driving assistance process can be similarly started in a more appropriate manner, even when a configuration such as this is provided.

Reference numbers within the parentheses recited in the scope of claims indicate corresponding relationships with specific means described according to an embodiment described hereafter as an aspect, and do not limit the technical scope of the present invention.

BRIEF DESCRIPTION OF DRAWINGS

In the accompanying drawings.

DESCRIPTION OF EMBODIMENTS

Figure 1:
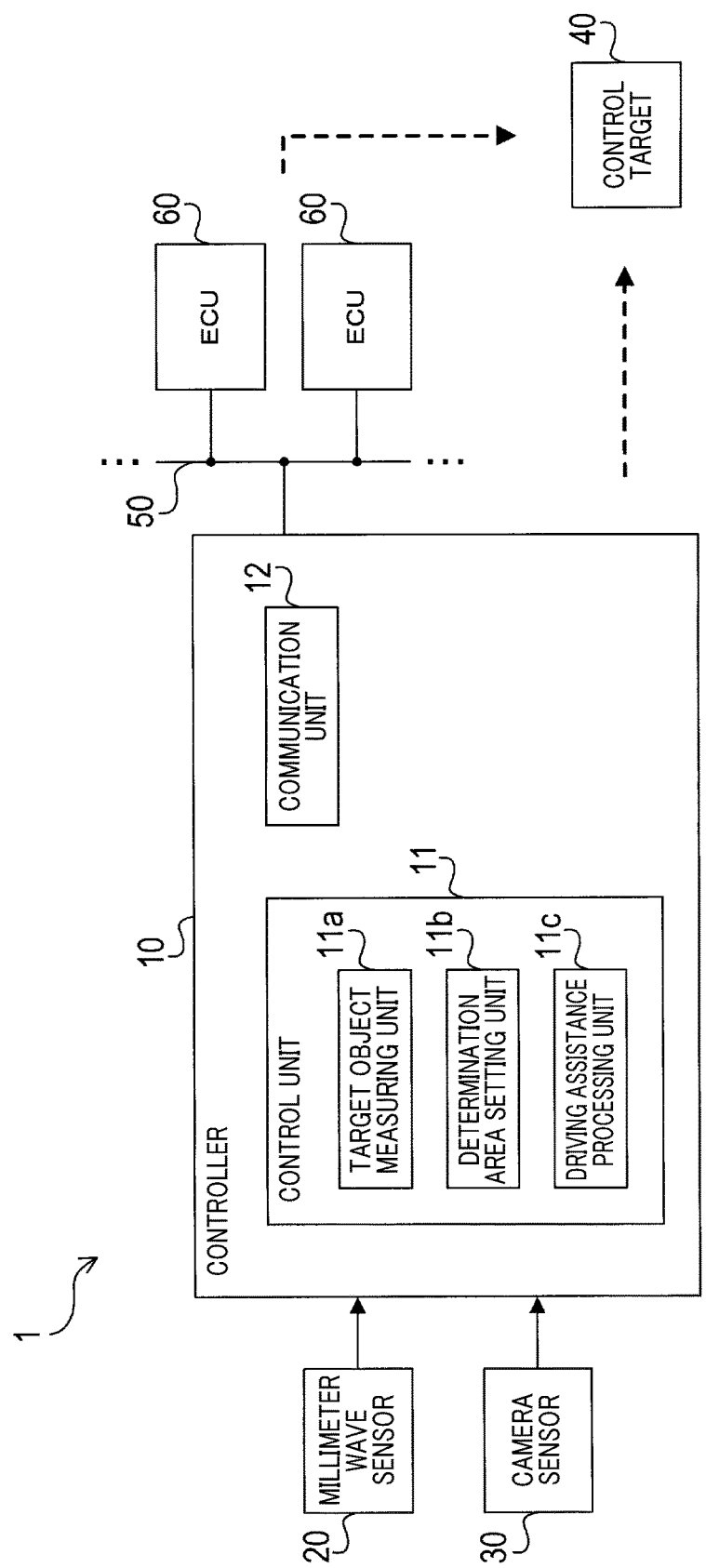
FIG. 1 is a block diagram of a configuration of a pre-crash safety system (PCS) according to an embodiment.

An embodiment of the present invention will hereinafter be described with reference to the drawings. Embodiments of the present invention are not limited in any way to the embodiment described below. Various embodiments are possible as long as the embodiments belong within the technical scope of the present invention.
[Description of Configuration]
A pre-crash safety system (referred to, hereafter, as PCS) 1 according to the present embodiment is mounted in a vehicle. The PCS 1 is a system for avoiding a collision or reducing damage in the event of a collision, by performing driving assistance, such by warnings and brake operation, when there is risk of an own vehicle colliding with a target object. Hereafter, a horizontal direction perpendicular to a frontward direction of the own vehicle is referred to as a lateral direction. The right-hand side facing the frontward direction of the own vehicle is referred to as a right side, and the left-hand side facing the frontward direction of the own vehicle is referred to as a left side.
The PCS 1 has a controller 10, a millimeter wave sensor 20, a camera sensor 30, and a control target 40. The controller 10 is connected to an on-board local area network (LAN) 50 to which 1 or a plurality of electronic control units (ECUs) 60 is connected (see FIG. 1).

The millimeter wave sensor 20 irradiates millimeter waves that have strong directivity, and detects position (relative position relative to the own vehicle), shape, size, and the like of a target object by receiving reflected waves of the millimeter waves.

In addition, the camera sensor 30 is configured as, for example, a stereo camera that is capable of detecting distance to the target object. Based on a captured image, the camera sensor 30 recognizes the shape of a target object (such as a pedestrian, a bicycle, an obstacle, or an automobile) within the image, the distance to the target object, and the like.

The controller 10 is provided with the detection result of a target object from the millimeter wave sensor 20 and the captured image from the camera sensor 30. The controller 10 acquires the detection result and the like from the millimeter wave sensor 20 and the camera sensor 20 at a predetermined cycle (such as 100 ms) set in advance, and based on the detection result and the like, recognizes the position and the like of the target object.

The configuration may, of course, be such that the position and the like of the target object is detected by either of the millimeter wave sensor 20 and the camera sensor 30. Alternatively, the configuration may be such that the position and the like of the target object is detected using a sensor other than the millimeter wave sensor 20 and the camera sensor 30.

In addition, the controller 10 has a control unit 11 and a communication unit 12. The control unit 11 is composed of a central processing unit (CPU), a read-only memory (ROM), a random access memory (RAM), an input/output (I/O), and the like (not shown). The communication unit 12 performs communication with the other ECUs 60 via the on-board LAN 50. The controller 10 provides a function as a computer. The CPU of the control unit 11 performs integrated control of the controller 10 and performs various processes by running programs stored in the ROM.

Specifically, the control unit 11 functions as a target object measuring unit 11a, a determination area setting unit 11b, and a driving assistance processing unit 11c.

The target object measuring unit 11a recognizes the position, type, and the like of the target object based on the detection result and the like acquired from the millimeter wave sensor 20 and the camera sensor 30. In addition, the target object measuring unit 11a measures a lateral-direction vector and a lateral-direction movement speed in the movement direction of the target object.

In addition, the determination area setting unit 11b sets a determination area (details are described hereafter) in correspondence to each target object. The determination area setting unit 11b performs an expansion process and the like for the determination area corresponding to the target object, based on the lateral-direction vector and the like of the target object.

In addition, when the target object enters the corresponding determination area, the driving assistance processing unit 11c operates the control target 40 and starts a driving assistance process. The control target 40 includes, for example, actuators that drive the brakes, the steering wheel, the seatbelts, and the like, and a warning apparatus that issues a warning. The driving assistance process may be a process in which a collision is avoided or damage in the event of a collision is reduced by the brakes, the steering wheel, the seatbelts, and the like being operated. Alternatively, the driving assistance process may be a process in which a warning regarding a collision is issued through sight, hearing, or the like.

In addition, the control target 40 may be connected to the controller 10 by a dedicated communication path. The driving assistance processing unit 11c may operate the control target 40 by outputting a direct control signal to the control target 40. In addition, the control target 40 may be provided in an ECU 60 connected to the on-board LAN 50. The driving assistance processing unit 11c may operate the control target 40 by communicating with the ECU 60 via the on-board LAN 50.

[Description of Operation]

Next, an operation of the PCS 1 according to the present embodiment will be described. According to the present embodiment, the millimeter wave sensor 20 and the camera sensor 30 are arranged at the center on a front end of the own vehicle. The position and the like of a target object present within a fan-shaped detection area of which the arrangement position is a starting position are detected using the millimeter wave sensor 20 and the camera sensor 30. The controller 10 determines whether or not the target object has entered the determination area provided ahead of the own vehicle, based on the detection results from the millimeter wave sensor 20 and the camera sensor 30. When the target object enters the determination area, the controller 10 starts the above-described driving assistance process.

Figure 2:
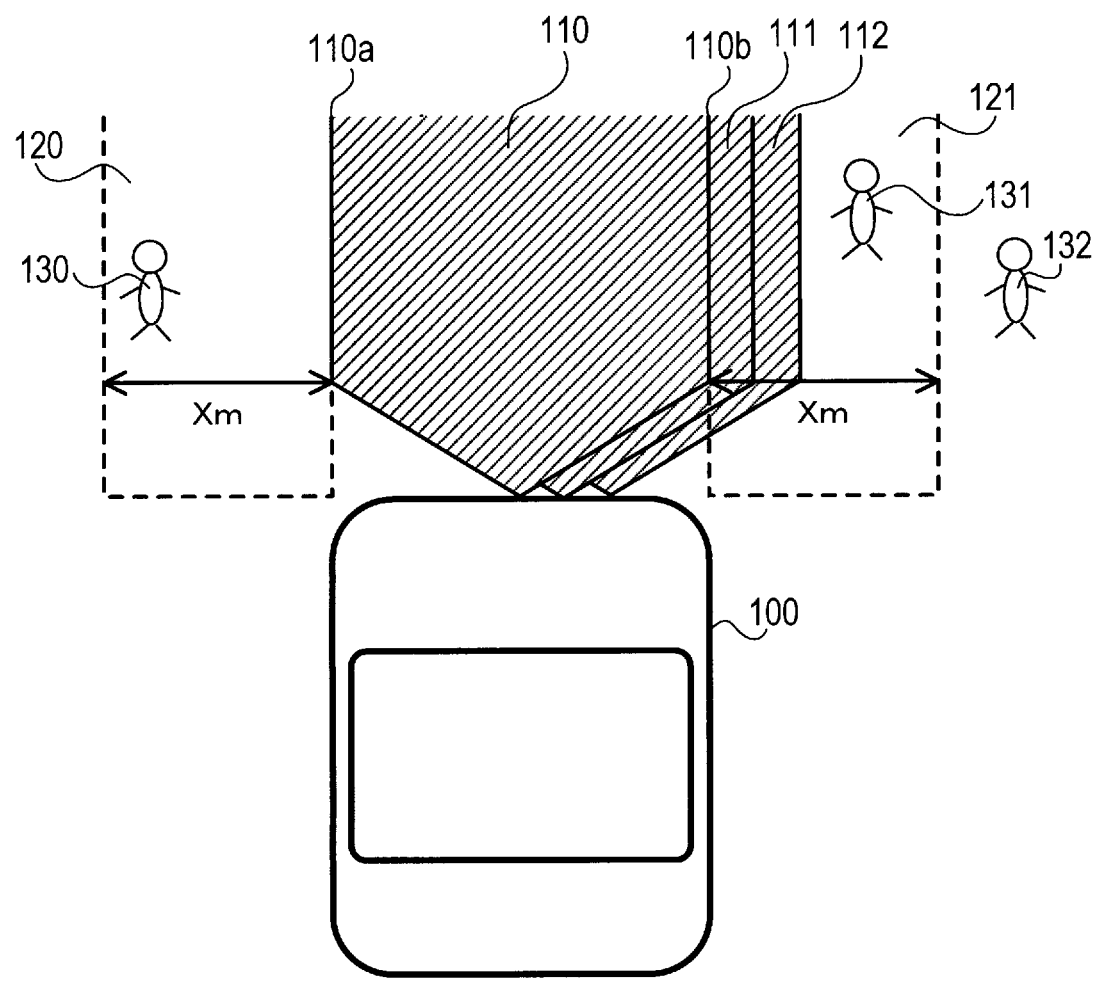
FIG. 2 is an explanatory diagram of determination areas and peripheral areas.
Figure 4:
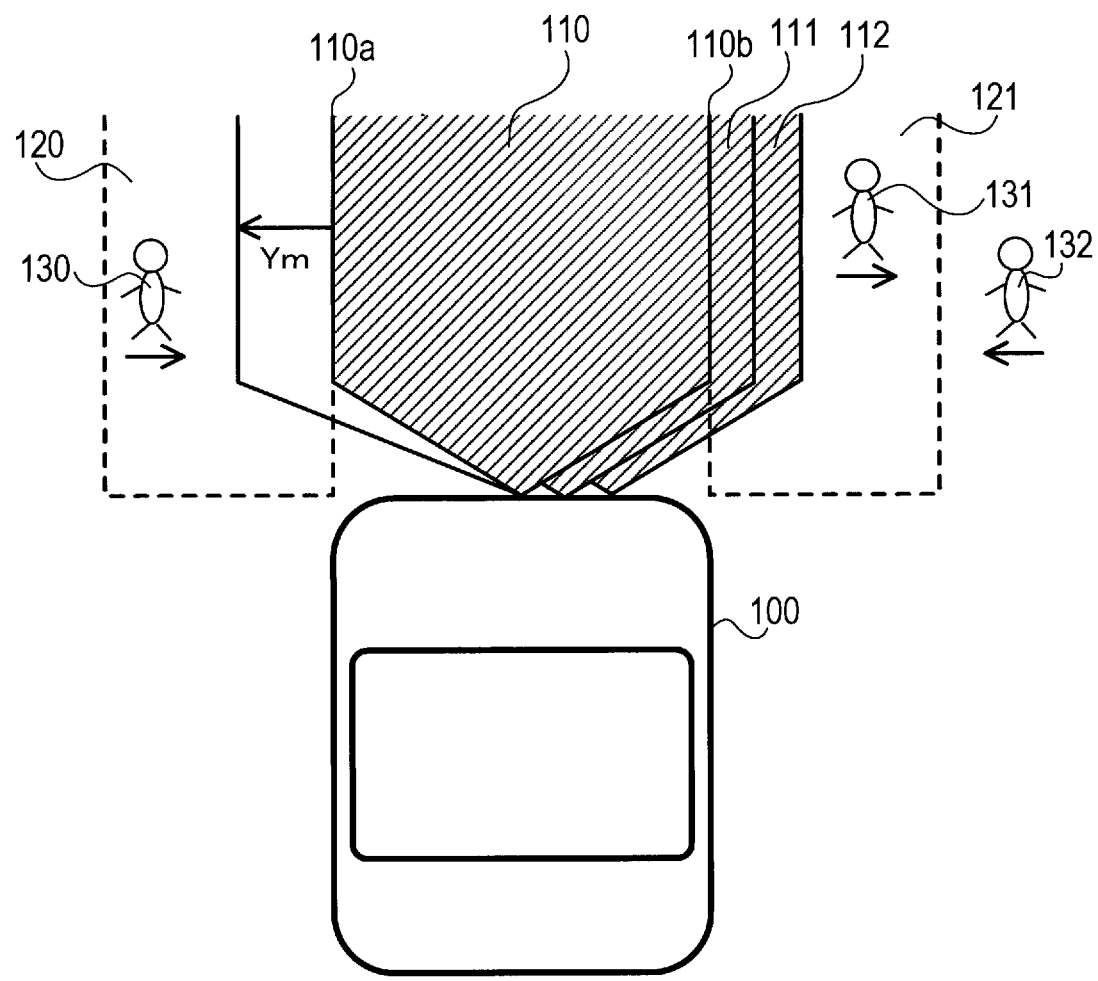
FIG. 4 is an explanatory diagram of an expansion process for the determination area.

When target objects 130, 131, and 133 are detected by the millimeter wave sensor 20 or the like, first, the controller 10 individually sets detection areas 110, 111, and 112 in correspondence to each of the target objects (see FIG. 2). In FIGS. 2 and 4, the positions of the determination areas 110, 111, and 120 are slightly shifted to facilitate understanding. However, in actuality, in a state in which the expansion process, described hereafter, is not performed, the positions, sizes, and shapes of the determination areas 110, 111, and 112 corresponding to the target objects are in a completely matching state.

The controller 10 may set, as the determination area, an overlapping portion between a strip-shaped area of a predetermined length extending in the frontward direction of an own vehicle 100 (may have a width that is about the vehicle width of the own vehicle 100 or a width that is of a length obtained by a predetermined value being added to the vehicle width), and the detection area of the millimeter wave sensor 20 or the like.

In addition to the foregoing, the controller 10 may set, as the determination area, an overlapping portion between a strip-shaped area of a predetermined length extending along a predicted course of the own vehicle 100 (may have a width similar to that of the above-described strip-shaped area), and the detection area. The predicted course may be prescribed, for example, based on a steering angle or the like acquired via the on-board LAN 50. Alternatively, the predicted course may be prescribed based on the shape or the like of a road on which the own vehicle 100 is traveling, acquired from a navigation apparatus via the on-board LAN 50.

Furthermore, peripheral areas 120 and 121 are set adjacent on either side of the determination area in a state in which the expansion process is not performed. The peripheral area 120 is arranged so as to be in contact with a boundary (also referred to as a side edge portion on the left side) 110a on the left side of the determination area 110. The peripheral area 120 has a predetermined width (X m), and is a strip-shaped area that extends from the front end of the own vehicle 100 towards the front end of the determination area 110. In addition, the peripheral area 121 is arranged so as to be in contact with a boundary (also referred to as a side edge portion on the right side) 110b on the right side of the determination area 110. The peripheral area 121 has a size and shape similar to those of the peripheral area 120.

When the target object present in the peripheral area 120 or 121 is moving towards the determination area corresponding to the target object, the controller 10 performs the expansion process in which the determination area corresponding to the target object is expanded such that the distance between the boundary of the determination area and the target object is shortened.

Figure 3:
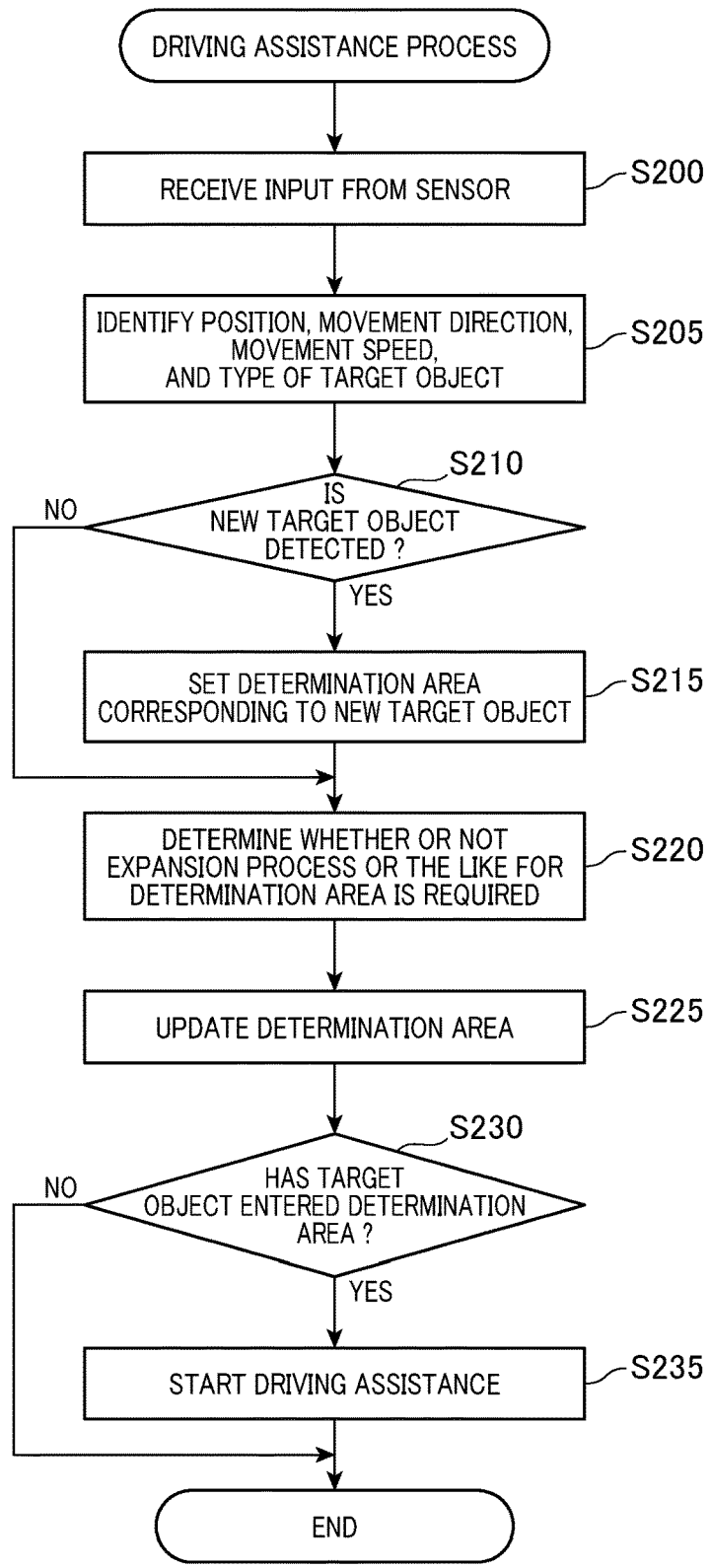
FIG. 3 is a flowchart of a driving assistance process.

The driving assistance process in which the expansion process or the like for a corresponding determination area is performed based on the lateral-direction vector or the like of a target object, and the driving assistance process is started when the target object enters the corresponding determination area will be described below (see FIG. 3). The present process is performed by the control unit 11 of the controller 10 at a periodic timing (such as at a 100-ms interval).

At step S200, the control unit 11 of the controller 10 acquires the detection result of the target object from the millimeter wave sensor 20 and the captured image from the camera sensor 30. The control unit 11 then proceeds to step S205.

At step S205, the control unit 11 recognizes the position, type, and the like of the target object present in the detection area based on the detection result from the millimeter wave sensor 20 and the captured image from the camera sensor 30. In addition, the control unit 11 calculates the lateral-direction vector and movement speed of the target object based on the currently recognized position of the target object, as well as history information on previous positions of the target object, a steering angle and an estimated value of the turning radius of the own vehicle 100, and the like.

At this time, the control unit 11 may acquire the steering angle, a yaw rate, and the like of the own vehicle 100 from another ECU 60 via the on-board LAN 50, and calculate the estimated value of the radius of rotation based on the acquired steering angle, yaw rate, and the like. The control unit 11 may then calculate the lateral-direction vector and movement speed of the own vehicle 100 based on the steering angle, the estimated value of the radius of rotation, and the like. The control unit 11 may then calculate the lateral-direction vector and movement speed of the target object based on the lateral-direction vector and movement speed of the own vehicle 100, the history of the positions of the target object, and the like.

At step S210, the control unit 11 determines whether or not a new target object is detected. When an affirmative determination is obtained (Yes at step S210), the control unit 11 proceeds to step S215. When a negative determination is obtained (No at step S210), the control unit 11 proceeds to step S220.

At step 215, the control unit 11 sets a determination area corresponding to the newly detected target object and proceeds to step S220.

Here, for example, when a plurality of types of driving assistance processes, such as a driving assistance process to operate the brakes and a driving assistance process to issue a warning, are performed, the control unit 11 may set a plurality of determination areas, each corresponding one on one to a type of driving assistance process, as the determination area corresponding to the new target object. It can be considered that these determination areas have the same size and shape, and are set ahead of the own vehicle as described above. However, the determination areas are not limited thereto. The determination areas may have differing sizes and shapes, and may be set in differing locations. In addition, the above-described peripheral area is set adjacent to each of these determination areas.

At step S220, the control unit 11 determines whether or not the expansion process or the like for the determination area is required. Specifically, when the target object present in the peripheral area 120 on the left side is moving to the right side, the target object is considered to be in an approaching state in which the target object is moving towards the corresponding determination area. In addition, when the target object present in the peripheral area 121 on the right side is moving to the left side, the target object is considered to be in the approaching state (see FIGS. 2 and 4). In addition, the determination area corresponding to the target object considered to be in the approaching state is determined to require the expansion process.

When the expansion process is no longer required for a determination area for which the expansion process has been performed (such as when the target object corresponding to the determination area is no longer in the approaching state), the control unit 11 determines that a reduction process in which the determination area is returned to an original state is required.

At subsequent step S225, the control unit 11 performs the expansion process for the determination area determined to require the expansion process, or the reduction process for the determination area determined to require the reduction process.

Here, a case in which the target object 130 present in the peripheral area 120 on the left side is in the approaching state will be described as an example (see FIG. 4). In this case, the determination area 110 corresponding to the target object 130 is expanded such that the side edge portion 110a on the left side becomes closer to the target object 130 without the length thereof being changed, while the position of the side edge portion 110b on the right side of the determination area 110 remains fixed. As a result of the expansion process, the side edge portion 110a on the left side is in a state in which the side edge portion 110a has moved towards the left by a correction distance (Ym).

Meanwhile, when the target object present in the peripheral area 121 on the right side is in the approaching state, the corresponding determination area is expanded such that the side edge portion on the right side becomes closer to the target object without the length thereof being changed, while the position of the side edge portion on the left side of the determination area remains fixed.

At this time, the control unit 11 may expand the determination area to become larger as the lateral-direction movement speed of the target object corresponding to the determination area determined to require the expansion process increases. Specifically, the control unit 11 may prescribe the correction distance by a following expression.

$$\text{Correction distance} = \text{base value} + \text{lateral-direction movement speed of target object} \times \text{delay time} \quad (1)$$

Here, the delay time may be added time of the time from when the warning is issued until the driver acknowledges the warning and presses the brake, and the own vehicle stops, and the cycle at which the controller 10 acquires the detection results and the captured images from the millimeter wave sensor 20 and the camera sensor 30. As an example, setting the delay time to about 0.4 seconds can be considered. In addition, the delay time may be increases as the lateral-direction movement speed of the target object increases.

Compared to a target object that is moving at a low speed, a target object moving at a high speed has a higher risk of collision and damage in the event of a collision increases. However, as a result of the correction distance being prescribed based on the movement speed, driving assistance is started at an earlier stage when the target object is moving at a high speed. Therefore, a collision with the target object can be avoided and damage in the event of a collision can be reduced with more certainty. The correction distance may be calculated using the movement speed of the target object, instead of the lateral-direction movement speed.

In addition, when calculating the correction distance, the control unit 11 may prescribe the correction distance based on the type of target object, by further multiplying the value calculated by the above-described expression (1) with a coefficient prescribed based on the type of target object. Specifically, the coefficients may be prescribed such that the correction distance increases when the target object is a pedestrian, compared to when the target object is a bicycle.

In general, the bicycle has a higher movement speed than the pedestrian. The risk of collision becomes high and the damage in the event of a collision becomes great. However, as a result of the correction distance being prescribed based on the type of target object, driving assistance is started at an earlier stage when the bicycle is moving towards the determination area. Therefore, a collision with the bicycle can be avoided with more certainty.

The control unit 11 may perform the expansion process for the corresponding determination area only when the target object is a pedestrian (or when the target object is a pedestrian, a bicycle, and the like).

In addition, when a plurality of types of driving assistance processes are performed and the determination areas respectively corresponding to the types of driving assistance processes are set, the control unit 11 may prescribe the correction distance of each determination area based on the corresponding type of driving assistance process.

Specifically, the control unit 11 may prescribe the correction distance of the determination area corresponding to the type of driving assistance process by further multiplying the value calculated by the above-described expression (1) with a coefficient prescribed based on the type of driving assistance. As a result of the coefficients being adjusted, for example, the correction distance for the driving assistance process performed by the brakes being operated may be shorter than the correction distance for the driving assistance process performed by the warning being issued.

As a result, erroneous starting of a driving assistance process that greatly affects driving can be prevented.

Here, a specific example in which the expansion process for a determination area is not performed will be described (see FIG. 4). The target object 131 is present in the peripheral area 121 on the right side. However, the target object 131 is moving towards the right side and is not moving towards the corresponding determination area 111. Therefore, the target object 131 is not in the approaching state. Consequently, the expansion process for the determination area 111 is not performed. In addition, although the target object 132 is moving towards the left side and is moving towards the corresponding determination area 112, the target object 132 is outside of the peripheral area 121. Therefore, the target object 132 is not in the approaching state. Consequently, the expansion process for the determination area 111 is not performed.

At subsequent step S230, the control unit 11 determines whether or not the target object has entered the corresponding determination area, based on the position of each target object. When a plurality of types of driving assistance processes are performed and the determination areas respectively corresponding to the types of driving assistance processes are set, the control unit 11 determines whether or not the target object has entered each of the plurality of determination areas respectively corresponding to the types of driving assistance processes.

Then, when determined that a target object that has entered the corresponding determination area is present (Yes at step S230), the control unit 11 proceeds to step S235. Otherwise (No at step S230), the control unit 11 ends the present process.

At step S235, the control unit 11 starts the above-described driving assistance process and ends the present process. When a plurality of types of driving assistance processes are performed and the determination areas respectively corresponding to the types of driving assistance processes are set, the control unit 11 starts the type of driving assistance process corresponding to the determination area into which the target object has entered.

[Effects]

In the PCS 1 according to the present embodiment, when a target object present in the peripheral areas positioned on both the left and right sides of the strip-shaped determination area moves towards the determination area, the expansion process is performed in which the determination area is expanded such that the side edge portion on the side on which the target object is positioned moves towards the target object.

As a result, when the target object is moving so as to approach the determination area and the risk of collision between the own vehicle and the target object is high, the determination area is expanded, and the driving assistance process is started at an earlier stage. Operation delay of the driving assistance process no longer occurs.

Meanwhile, when the lateral-direction movement speed of the target object positioned in the peripheral area is zero (also referred to as a stationary state), or when the target object is moving towards the side opposite the determination area, the determination area is not expanded. An unnecessary driving assistance process is not started.

Therefore, the driving assistance process can be started in a more appropriate manner.

In addition, in the expansion process, the determination area is expanded such that the side edge portion on the side on which the target object is positioned moves towards the target object, and the position of the side edge portion on the opposite side is not changed. Therefore, the determination area can be expanded and returned to the original state by a simple process. Processing load can be suppressed.

In addition, according to the present embodiment, the expansion process is performed only when, of the detected target objects, the target object positioned in the peripheral area adjacent to the determination area is moving towards the determination area. As a result, the determination area is expanded only when a target object that is highly likely to enter the determination area is present. The starting of an unnecessary driving assistance process can be prevented.

In addition, according to the present embodiment, the determination areas are individually set for the target objects. The driving assistance process is started as a result of the target object entering the corresponding determination area. The expansion process for the corresponding determination area is performed based on the lateral-direction vector of the target object.

Therefore, a situation in which, as a result of the determination area being expanded based on the movement of a certain target object, another target object that is in a stationary state or a target object moving towards the side opposite the determination area becomes positioned within the determination area no longer occurs. As a result, the starting of an unnecessary driving assistance process can be prevented.

[Other Embodiments]

An embodiment of the present invention is described above. However, the present invention is not limited to the above-described embodiment and various embodiments are possible.

(1) In the PCS 1 according to the above-described embodiment, the determination area is provided in correspondence to each target object. However, the determination area is not limited thereto. A determination area that is commonly used among all target objects may be provided. In addition, in a manner similar to that according to the above-described embodiment, the expansion process and the like for the determination area may be performed based on the lateral-direction vectors and the like of the target objects, and the driving assistance process may be started when any of the target objects enters the determination area. The driving assistance process can be started in a more appropriate manner, even when a configuration such as this is provided.

In addition, even when a common determination area such as this is provided, when a plurality of types of driving assistance processes are performed, a plurality of determination areas commonly used among all target objects may be provided in correspondence to the types of driving assistance processes. In addition, in a manner similar to that according to the above-described embodiment, the expansion process and the like for each determination area may be performed at a level based on the corresponding type of driving assistance process, based on the lateral-direction vectors and the like of the target objects. When a target object enters a determination area, the type of driving assistance process corresponding to the determination area may be started. Erroneous starting of a driving assistance process that greatly affects driving can be prevented, even when a configuration such as this is provided.

In addition when a common determination area such as this is used, as described above, as a result of only the side edge portion near the target object that is in the approaching state, of the boundaries of the determination area, being changed in the expansion process, other target objects that are not in the approaching state can be prevented from entering the determination area. Consequently, starting of an unnecessary driving assistance process can be prevented.

(2) In addition, the determination area according to the above-described embodiment is a strip-shaped area that extends in the frontward direction of the own vehicle. However, the shape of the determination area is not limited thereto. For example, an area surrounding the periphery of the own vehicle or a fan-shaped area that spreads from the front end of the own vehicle may be set as the determination area.

In addition, when areas adjacent so as to surround the determination area shaped in this way are the peripheral areas and, in a manner similar to that according to the above-described embodiment, a target object present in the peripheral area is moving towards the determination area, the determination area may be expanded such that the target object reaches the determination area at an earlier stage. At this time, the determination area can be expanded by an intersecting zone of the boundaries of the determination area being changed. The intersecting zone includes a section with which the target object is predicted to intersect upon entry into the determination area. The intersecting zone may be a continuous zone in the boundaries of the determination area of which the distance to the target object is a predetermined value or less.

The driving assistance process can be started in a more appropriate manner, even when a configuration such as this is provided.

(3) in addition, according to the above-described embodiment, in the expansion process for the determination area, the determination area is expanded in a state in which, of the boundaries of the strip-shaped determination area, the side end portion on the side on which the target object is present approaches the target object and the side edge portion on the opposite side is fixed. However, the determination area is not limited thereto. The overall determination area may be expanded at a predetermined scale ratio in the expansion process. Similar effects can be achieved even in a case such as this.

(4) In addition, according to the above-described embodiment, the peripheral areas adjacent to the determination area are provided. The expansion process is performed when the target object present in the peripheral area moves towards the determination area. However, the peripheral areas may not be provided. The expansion process for the determination area may be performed when a detected target object moves towards the determination area. The driving assistance process can be started in a more appropriate manner even in a case such as this.

(5) A function provided by a single constituent element according to the above-described embodiment may be dispersed as a plurality of constituent elements. Functions provided by a plurality of constituent elements may be integrated in a single constituent element. Furthermore, at least a part of a configuration according to the above-described embodiment may be replaced by a publicly known configuration having a similar function. In addition, a part of a configuration according to the above-described embodiment may be omitted. Furthermore, at least a part of a configuration according to an above-described embodiment may be added to or replace a configuration according to another above-described embodiment. All aspects included in the technical concept identified solely by the expressions recited in the claims are embodiments of the present invention.

(6) The present invention can also be actualized through various embodiments in addition to the above-described PCS 1, such as the controller 10 configuring the PCS 1, a program enabling a computer to function as the controller 10, a medium on which the program is recorded, and a method corresponding to the driving assistance process.

[Correspondence with Scope of Claims]

Correspondence between the terms used in the description of the above-described embodiment and the terms used in the expressions in the scope of claims will be indicated. The controller 10 configuring the PCS 1 corresponds to an example of a driving assistance apparatus. In addition, in the driving assistance process by the control unit 11, step S200 corresponds to an example of a measuring means. Step S205 corresponds to an example of the measuring means and a determining means. Step S215 corresponds to an example of a setting means. Steps S220 and S225 correspond to an example of a correcting means. Steps S230 and S235 correspond to an example of a driving assisting means.

REFERENCE SIGNS LIST

1: PCS
10: controller

11: control unit
11a: target object measuring unit
11b: determination area setting unit
11c: riving assistance processing unit
12: communication unit
20: millimeter wave sensor
30: camera sensor
40: control target
50: on-board LAN
60: ECU

The invention claimed is:

1. A driving assistance apparatus comprising:
a measuring means that measures a position and a movement direction of a target object present in an own vehicle periphery;
a driving assisting means that performs a driving assistance process of the own vehicle when the position of the target object measured by the measuring means is within a determination area provided in the own vehicle periphery; and
a correcting means that corrects the determination area in a direction at which the target object is measured when the target object measured by the measuring means is determined to be moving towards the determination area.

2. The driving assistance apparatus according to claim 1, wherein:
a partial zone, among boundaries of the determination area, including a section with which the target object moving towards the determination area is predicted to intersect upon entry into the determination area is an intersecting zone; and
the correcting means changes the intersecting zone when the target object is moving towards the determination area, thereby correcting the determination area such that the target object reaches the determination area at an earlier stage.

3. The driving assistance apparatus according to claim 2, wherein:
the correcting means corrects the determination area when the target object positioned in a peripheral area adjacent to the determination area is determined to be moving towards the determination area.

4. The driving assistance apparatus according to claim 3, wherein:
the determination area is provided ahead of the own vehicle;
the target object positioned on a right side of the determination area facing a frontward direction of the own vehicle is a right-side target object, and the target object positioned on a left side of the determination area facing the frontward direction is a left-side target object; and
the correcting means corrects the determination area such that a boundary on the right side of the determination area moves towards the right side when the right-side target object is moving towards the determination area, and corrects the determination area such that a boundary on the left side of the determination area moves towards the left side when the left-side target object is moving towards the determination area.

5. The driving assistance apparatus according to claim 4, wherein:
the measuring means further measures a movement speed of the target object; and
the correcting means corrects the determination area to a greater degree as the movement speed of the target object measured by the measuring means increases.

6. The driving assistance apparatus according to claim 5, further comprising:
a setting means that sets the determination area in correspondence to each target object, wherein
the driving assisting means performs the driving assistance process when the position of the target object is within the determination area corresponding to the target object, and
the correcting means corrects the determination area such that the target object reaches the determination area at an earlier stage when the target object is determined to be moving towards the determination area corresponding to the target object.

7. The driving assistance apparatus according to claim 6, further comprising:
a determining means that determines a type of the target object, wherein
the correcting means corrects the determination area at a level based on the type of the target object determined by the determining means, when the target object is determined to be moving towards the determination area.

8. The driving assistance apparatus according to claim 7, wherein:
the driving assisting means performs a plurality of types of driving assistance processes;
the determination area is provided in correspondence with each type of driving assistance process;
the driving assisting means performs the driving assistance process of the type corresponding to the determination area when the position of the target object measured by the measuring means is within the determination area; and
the correcting means corrects the determination area corresponding to each type of driving assistance process at a level based on the corresponding type of driving assistance process, when the target object is determined to be moving towards the determination area.

9. A driving assistance method comprising:
measuring, by a measuring means of a driving assistance apparatus mounted in an own vehicle, a position and a movement direction of a target object present in the periphery of the own vehicle;
performing, by a driving assisting means of the driving assistance apparatus, a driving assistance process of the own vehicle when the position of the target object measured by the measuring means is within a determination area provided in the periphery of the own vehicle; and
correcting, by a correcting means of the driving assistance apparatus, the determination area in a direction at which the target object is measured when the target object measured by the measuring means is determined to be moving towards the determination area.

10. The driving assistance apparatus according to claim 1, wherein:
the correcting means corrects the determination area when the target object positioned in a peripheral area adjacent to the determination area is determined to be moving towards the determination area.

11. The driving assistance apparatus according to claim 1, wherein:

the determination area is provided ahead of the own vehicle;

the target object positioned on a right side of the determination area facing a frontward direction of the own vehicle is a right-side target object, and the target object positioned on a left side of the determination area facing the frontward direction is a left-side target object; and the correcting means corrects the determination area such that a boundary on the right side of the determination area moves towards the right side when the right-side target object is moving towards the determination area, and corrects the determination area such that a boundary on the left side of the determination area moves towards the left side when the left-side target object is moving towards the determination area.

12. The driving assistance apparatus according to claim 1, wherein:

the measuring means further measures a movement speed of the target object; and the correcting means corrects the determination area to a greater degree as the movement speed of the target object measured by the measuring means increases.

13. The driving assistance apparatus according to claim 1, further comprising:

a setting means that sets the determination area in correspondence to each target object, wherein the driving assisting means performs the driving assistance process when the position of the target object is within the determination area corresponding to the target object, and the correcting means corrects the determination area such that the target object reaches the determination area at an earlier stage when the target object is determined to be moving towards the determination area corresponding to the target object.

14. The driving assistance apparatus according to claim 1, further comprising:

a determining means that determines a type of the target object, wherein the correcting means corrects the determination area at a level based on the type of the target object determined by the determining means, when the target object is determined to be moving towards the determination area.

15. The driving assistance apparatus according to claim 1, wherein:

the driving assisting means performs a plurality of types of driving assistance processes;

the determination area is provided in correspondence with each type of driving assistance process;

the driving assisting means performs the driving assistance process of the type corresponding to the determination area when the position of the target object measured by the measuring means is within the determination area; and the correcting means corrects the determination area corresponding to each type of driving assistance process at a level based on the corresponding type of driving assistance process, when the target object is determined to be moving towards the determination area.

* * * * *